United States Patent [19]

Singer

[11] 4,043,700
[45] Aug. 23, 1977

[54] X-Y CONTROL FOR RADIAL ARM AND HEADSTOCK OF A RADIAL DRILLING MACHINE

[75] Inventor: Arrigo Singer, Bronx, N.Y.

[73] Assignee: Toolmatic Corporation, Carlstadt, N.J.

[21] Appl. No.: 741,781

[22] Filed: Nov. 15, 1976

[51] Int. Cl.² .................. B23B 39/12; B23B 39/04
[52] U.S. Cl. .................................. 408/237; 408/3;
408/88; 408/131; 90/13 C
[58] Field of Search .............. 408/237, 131, 1, 3,
408/88, 13; 90/13 C

[56] References Cited
U.S. PATENT DOCUMENTS

| 2,876,650 | 3/1959 | Sangster | 408/3 |
|---|---|---|---|
| 2,992,570 | 7/1961 | Raine | 408/237 |
| 3,973,859 | 8/1976 | Huber et al. | 408/237 |
| 3,981,605 | 9/1976 | Wirsing | 408/88 |
| Re. 26,393 | 5/1968 | Daugherty | 408/88 |

Primary Examiner—Leonidas Vlachos
Attorney, Agent, or Firm—J. B. Felshin

[57] ABSTRACT

This invention comprises a control for moving a headstock longitudinally on a radial arm of a radial drilling machine and for moving the radial arm angularly about the axis of rotation, by moving the headstock a predetermined distance along an X—X axis and also moving said headstock a predetermined distance along a Y—Y axis at right angles to the X—X axis, for bringing the axis of the drill spindle on the headstock from one drilling position to another drilling position. One Servo motor moves the headstock on the X—X axis and another motor moves it on the Y—Y axis. The motors may be programmed to move said headstock automatically. When the headstock is moved on the radial arm along the Y—Y axis, angular movement of the radial arm is accompanied by movement of the headstock longitudinally of the radial arm. Thus, the movement of the headstock along X—X and Y—Y axes, also moves the radial arm angularly.

21 Claims, 5 Drawing Figures

X-Y CONTROL FOR RADIAL ARM AND HEADSTOCK OF A RADIAL DRILLING MACHINE

This invention relates to X—Y controls for the radial arm and headstock of radial drilling machines and to the combination of radial drilling machines and such controls therefor and for other machines having a radial pivoted component and another component slidable on the radial pivoted component.

The basic novelty of this arrangement is based upon the fact that we are using a radial arm drilling machine for rectangular coordinate positioning of the headstock drill spindle. The headstock and radial arm of a radial arm drilling machine can be manually or automatically manipulated. However, one coordinate moves in a straight line (headstock left and right), the other coordinate (radial arm) moves in an arc (around the center of the column). Therefore, if you want to manipulate the spindle from one position to a new position, the new position would comprise a mathematical function of angle of the arm (arc) and a linear movement of the headstock (radius). This makes direct programming very impractical.

By manipulating the headstock spindle in a rectangular coordinate system in accordance with the present invention, the radial arm and the headstock are passively following the prescribed path of the rectangular slide system.

Radial drilling machines have been used as layout drills. In these cases the radial arm has been mechanically fixed. A X—Y coordinate work table with two slides is placed underneath the machine, i.e., headstock spindle. These tables usually have a maximum limit on the weight of the workpiece. They are also more expensive than the present overhead slide system.

Instead of manipulating the workpiee in X—Y coordinates, the present slide manipulates the work spindle instead, i.e., the tool only. This places practically no limit on the maximum weight of the workpiece. The drilling capacity of the radial drill can be fully utilized to its maximum capacity.

The present arrangement is relatively inexpensive and can be adapted to any radial drilling machine to convert it into an X—Y coordinate layout drill with considerable cost savings.

One object of this invention is to provide a mechanical, power-driven manipulating device or control to move the headstock or drilling head of a radial arm drilling machine in a rectangular, coordinate pattern, in a similar way in which a human operator would operate such a machine to drill holes in a horizontal plane, reached by the sweep of the radial arm and by the travel of the headstock along the arm.

Another object of this invention is to provide a control of the character described which consists of a T-shaped cross slide mounted above the column of the radial arm drilling machine on an extension support mounted on a fixed frame around the radial arm column. Mounted on this support is a mechanical, precision-guided slide which moves left and right (X-axis) by an actuating screw driven by a Servo-Motor. To one end of this X-slide is mounted another slide which moves front and back (Y-axis). This Y slide is operated by a second actuating screw, driven by a second Servo-Motor. To this Y-slide is attached a bearing, to move the work spindle in an X—Y pattern. This bearing journals a shaft extension mounted on top of the drilling head, exactly in the center line of the drilling spindle. In this manner the drill spindle will move in an X—Y coordinate pattern. The movements of the X and Y slides causes the radial arm to swing and the drilling head to travel along the radial arm much in the same manner as it does when operated manually by a human operator.

In this manner the advantages of a power-driven coordinate slide motion can be applied to the proven and simple frame of a radial arm drilling machine, combining all the advantages of rigidity, simplicity and ease of motion of a radial arm drilling machine with the precise rectangular coordinate motion of a boring and layout drilling machine, where either the workpiece is moved in a coordinate pattern, or the drilling head is attached to heavy columns and slides on which it travels and which also have to take the entire cutting load of the tool, which is not the case in the above described system.

Still another object of this invention is to provide a control of the character described which can readily be applied to a usual radial drilling machine, which shall be relatively inexpensive to manufacture, easy to operate and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described and of which the scope of the invention will be indicated in the following claims.

IN THE DRAWINGS

Figure 1:
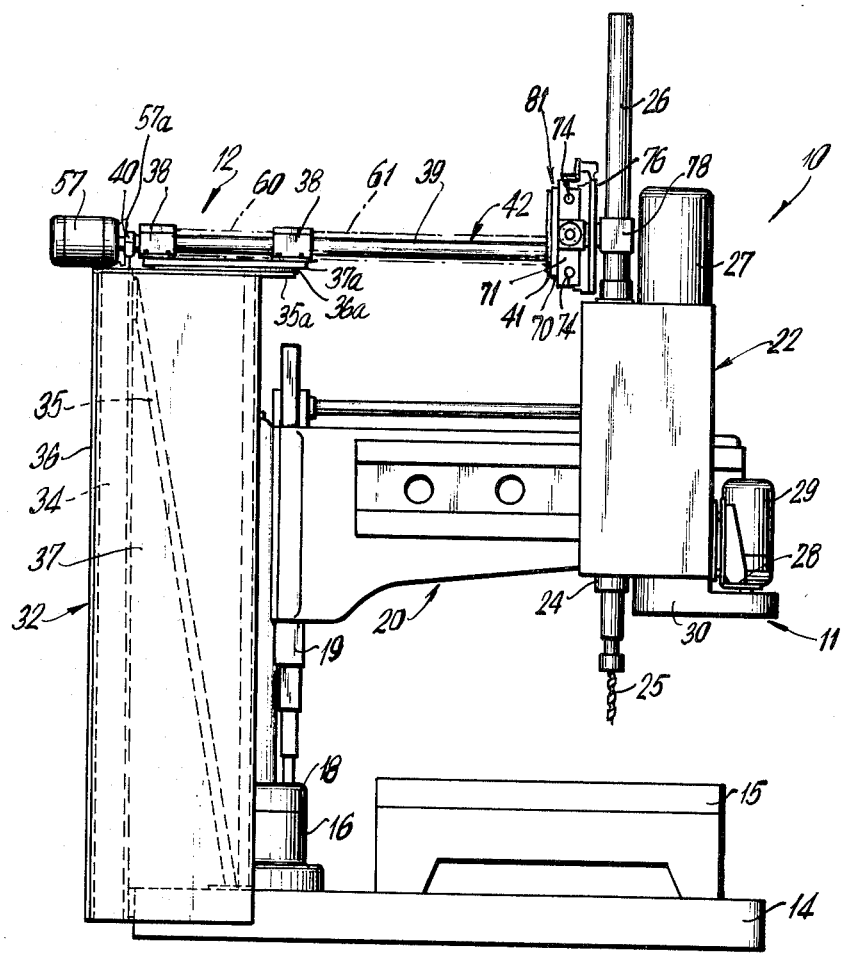
FIG. 1 is a front elevational view of a radial drilling machine provided with a control embodying the invention.

Referring now in detail to the drawings, 10 designates a radial drill and control combination comprising a radial drilling machine 11 and a control 12 therefor, embodying the invention.

The radial drilling machine can be of usual construction substantially with some changes.

Said radial drilling machine comprises a base 14 on which is clamped a table 15 to the upper side of which the work piece to be drilled, may be clamped in usual fashion. At one end of the base 15 is an annular thrust bearing 16 fixed to said base. Journaled in said bearing 16 is a vertical column or casing 18 rotatable about a vertical axis. One side of said column 18 is open. Said column 18 has at its open side, spaced vertical guides 19. Mounted on said guides 19 is a usual radial arm 20. The arm 20 rotates about the axis of column 18.

Suitable well known means (not shown) is provided to releasably lock the radial arm 20 to the guides 19 and hence to the column 18, at any suitable vertical adjusted height. The arm extends generally horizontally above the base 14. Slidably mounted on the radial arm by means of dovetail and flat ways and roller (not shown) in the usual way, is a headstock or drilling head 22. Usual means (not shown) is provided for releasably locking the headstock in various adjusted positions on the arm 20.

The headstock has a usual drill-spindle 24 projecting below the headstock, for carrying the drill 25. Fixed to the drill head is a shaft 26 projecting above the upper end of the headstock. Shaft 26 is coaxial with the spindle 24. On top of the headstock is a motor 27 for turning the drill spindle. On the headstock is a bracket 28 carrying a motor 29. This is a controlled motor to move the spindle up and down, through a timing belt not shown but housed in casing 30.

The manual means for moving the spindle up and down in the usual radial drilling machine may be omitted from the present machine.

Mounted on the base 14 and partially surrounding the column 18 is a frame 32 comprising vertical front supports 33, rear vertical support 34 and upwardly and rearwardly inclined support 35. The frame 32 may comprise a rear sheet metal wall 36 and paralled front and rear walls 37. The frame 32 extends up above the height of column 18 and headstock 22.

At the top of the frame 32 is a fixed plate 35a. Fixed to the top of plate 35a is another plate 36a.

Figure 2:
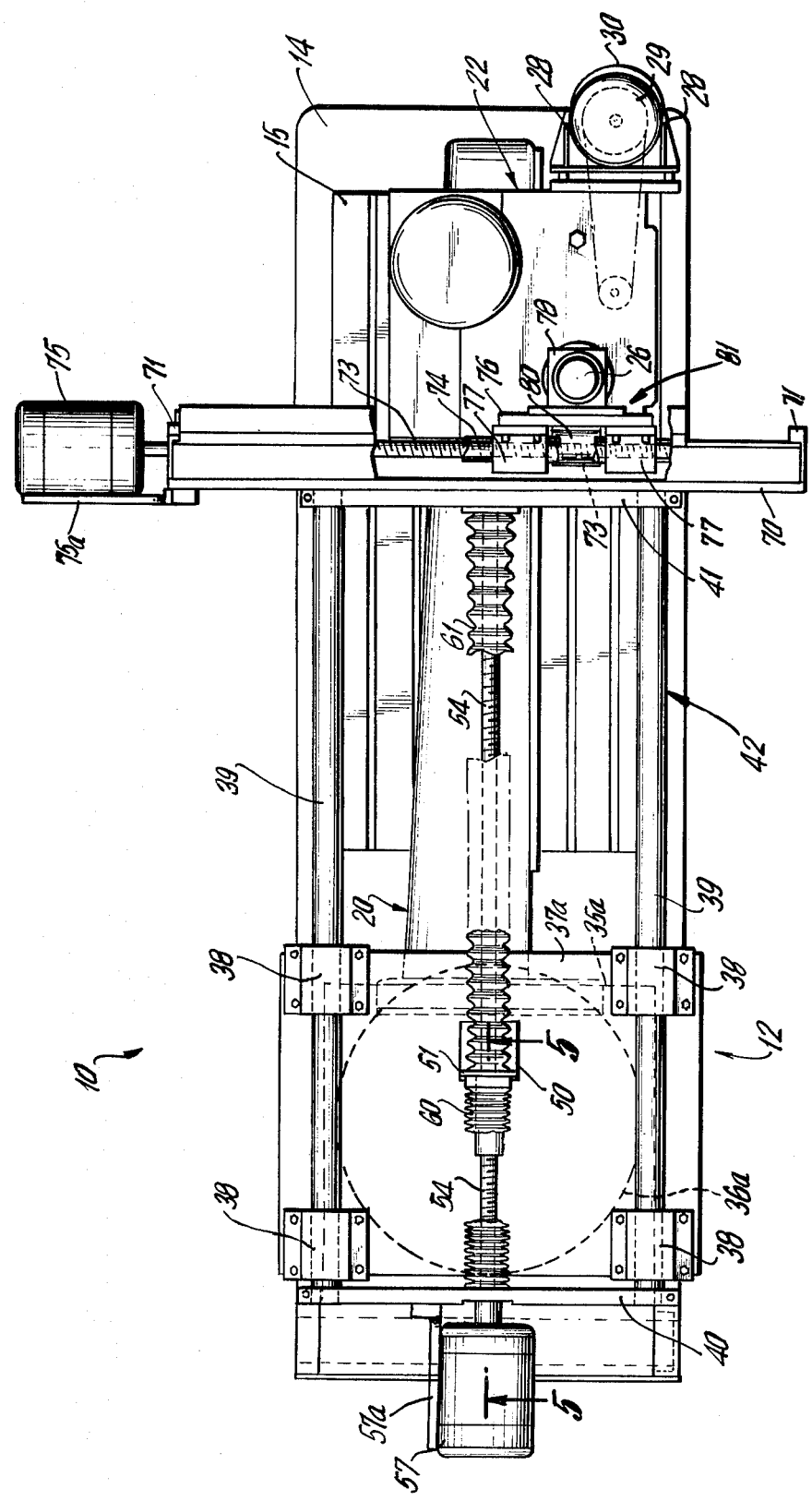
FIG. 2 is a top plan view of the structure of FIG. 1.

The control 12 is mounted on said plate 35a. Said control 12 comprises a rectangular plate 37a fixed to plate 36a and on which are fixed two paralled pairs of spaced aligned bushings 38. One pair of bushings 38 is paralled to and aligned with the other pair of bushings 38. Slidable in each pair of bushings 38 is a horizontal guide rod 39. The rods 39 are coextensive and parallel. Fixed to opposite ends of said rods 39 are end plates 40, 41 respectively. These plates may be interconnected with additional braces if desired and form a slide or carriage 42 slidable to the left and right on an X—X axis. In FIG. 2 carriage or slide 42 is shown in a position substantially moved fully to the right.

Figure 5:
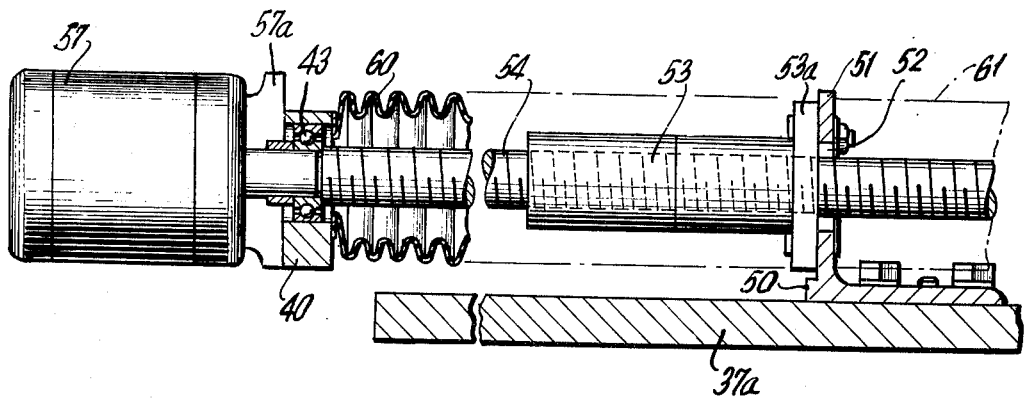
FIG. 5 is a cross-sectional view taken on line 5—5 of FIG. 2.
Figure 3:
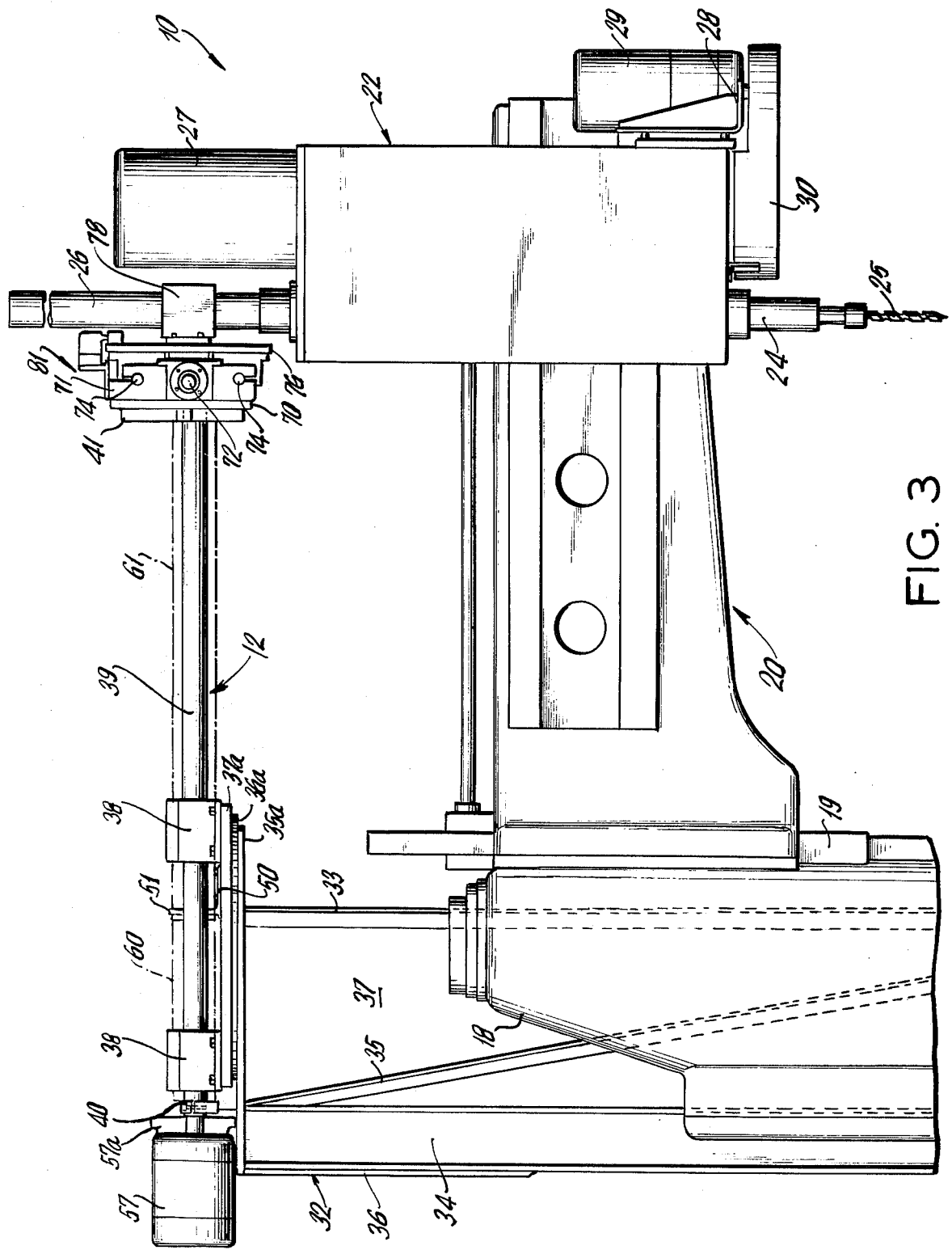
FIG. 3 is an enlarged view of the front upper end of the structure shown in FIG. 1.

Fixed to the plate 37a (FIG. 5) is a bracket 50 having an upstanding flange 51 formed with a central opening 52. Fixed to the left side of flange 51 is a horizontal nut 53 parallel to rods 39 and disposed horizontally midway therebetween. The bracket 50 is disposed between the left bushings 38 and the right bushings 38 and equally spaced from the rods 39. The nut 53 has an end flange 53a fixed to flange 51 and is internally screw threaded. Screwed into the nut 53 is a longitudinal screw 54, the ends of which are non-slidably journaled in opposed ball bearings 43 in plates 40, 41. The screw passes through plate 40 as shown in FIGS. 3 and 5. The left end of the screw is attached to a Servo Motor 57. Motor flange 57a is attached to plate 40 for supporting the motor 57. It will now be understood that when motor 57 rotates the screw in one direction, the slide 42 is moved to the right, looking at FIG. 1, and when the screw is turned in an opposite direction, the slide 42 moves to the left. The screw 54 passes through opening 52 in the flange 51 of bracket 50, as shown in FIG. 5. Slide 42 thus moves on an X—X axis as will be explained hereinafter.

Figure 4:
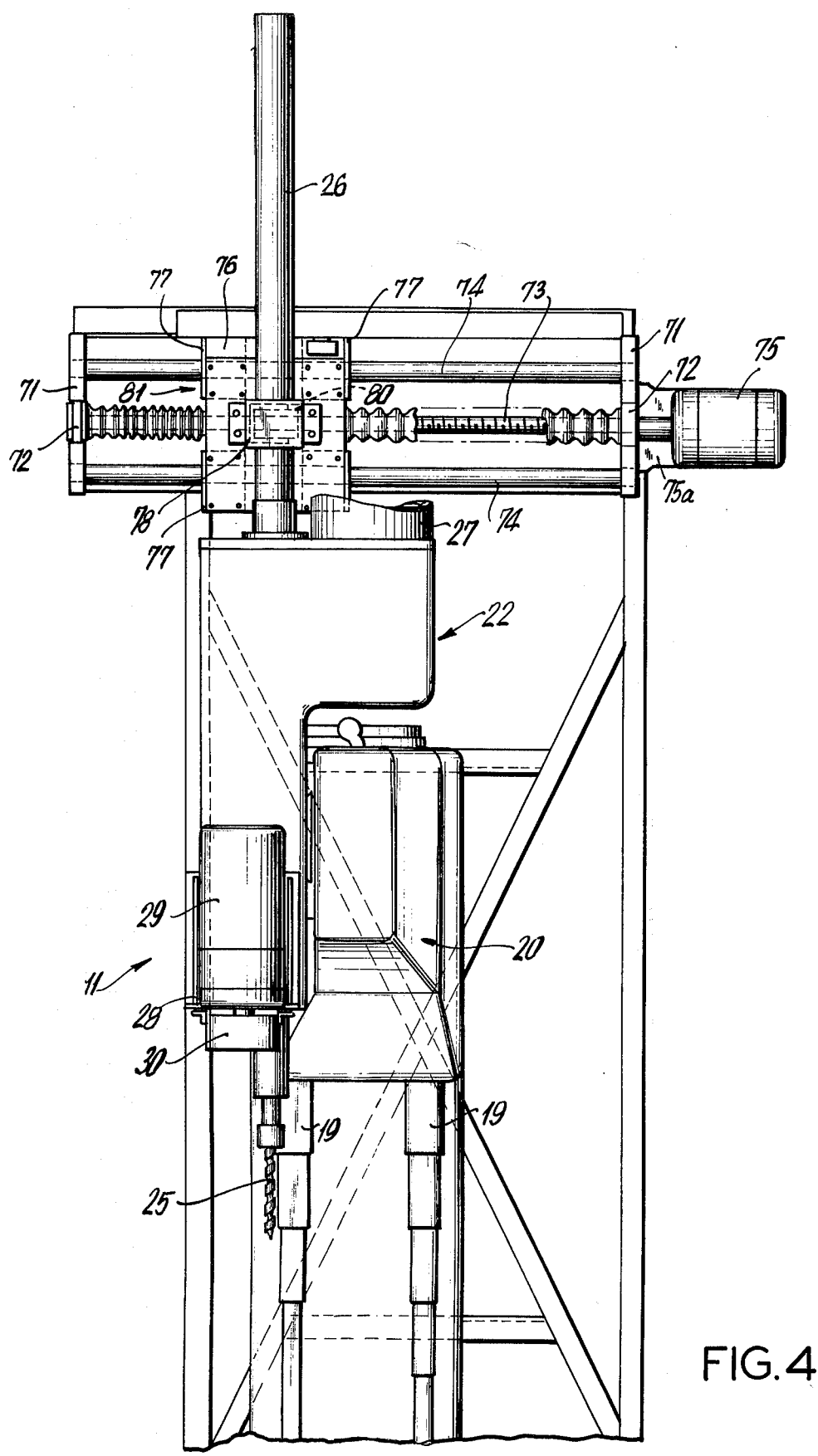
FIG. 4 is a right end view of the structure shown in FIG. 3.

One bellows tube 60 surrounding the screw 54, is interposed between plate 40 and end flange 53a of nut 53. A second bellows tube 61 surrounds the screw 54 and is interposed between flange 51 and plate 41. Fixed to the plate 41 is a plate 70 extending beyond the ends of said plate 41. At the ends of plate 70 aare end flanges 71 at right angles to said plate. Non-slidably but rotatably journaled in suitable bearings 72 on flanges 71 is a horizontal screw 73. Said end flanges are interconnected by a pair of spaced, parallel, horizontal guide rods 74. The screw 73 is centrally located between the rods 74 (See FIG. 4). Attached to one end of the screw is a second Servo Motor 75. A motor flange or bracket 75a attached to plate 71 supports motor 75. The plate 70, end flanges 71, and rods 74 become part of slide 42 and move therewith. Fixed to a plate 76 in a vertical plane are two pairs of aligned bushings 77 through which the rods 74 pass in a sliding fit. Plate 76 is parallel to and spaced from plate 70. The bushings 77 are disposed between the plate 76 and the plate 70.

Fixed to the right side of plate 76 (FIG. 2) is a bushing 78 formed with a through hole in a vertical direction. The shaft 26 rotatably passes through the hole in the bushing 78.

Also fixed to left side of plate 76 (FIG. 2) is a nut 80 treadedly receiving the screw 73.

It will now be understood that when Motor 75 is energized, rotation of screw 73 will move the plate 76 forwardly or rearwardly depending on the direction of rotation of the screw.

Plate 70, flanges 71, rods 74, screw 73 and motor 75 move to the left or right together with slide 42 when motor 57 is energized.

Plate 76, bushings 77, nut 80 and bushing 78 constitute a second slide 81, which moves horizontally forwardly or rearwardly on a Y—Y axis at right angles to the X—X axis.

Thus, when motor 57 is energized while radial arm 20 in parallel to the axis of slide 42, movement of said slide results in sliding movement of the headstock on the radial arm. Movement of the slide 81 relative to slide 42 will result in movement of the headstock forwardly or rearwardly and such movement will cause angular movement of the radial arm, and also sliding movement of the headstock relative to the radial arm. Such movement results from shaft 26 being rotatable in bushing 78.

The Servo-motors 57, 75 may be programmed to move the slides 42 and 81 along X—X and Y—Y axes to bring the drill spindle from one drill position to another. Both motors may operate concurrently.

An operator working on usual radial drilling machines would manually move the headstock on the radial arm and also move the radial arm angularly to bring the drill from one drilling position to another.

With the present system, only X—Y movements are made of the slides 42 and 81.

The headstock and radial arm of a radial drilling machine can be positioned manually. In such case, the headstock is moved in a straight line on the radial arm, but the radial arm moves in an arc around the axis of the column. Hence, to manipulate the drill spindle from one drilling position to another, the new position would comprise a mathemetical function of the angle of the arm and of the linear movement for the headstock (radius). This makes direct programming impractical. The computer programming for rectagular distances from one drilling position to another is far simpler. The operation of the Servo-Motors 57 and 75 for rectangular movements of the slides is far simpler to program.

To drill, the radial arm and column are clamped. Then the drill (after being brought to drilling position) is moved down in slow speed, in the well known manner. After drilling the work piece, the drill is moved up by rapid feed, by the usual means. Then the radial arm and headstock are unclamped. Then the Servo-Motors are operated under control of computerized programming, to position the drill to the next drilling position, and this is done by means of the X—Y slides automatically.

By manipulating the headstock and the radial arm in a rectangular coordinate system in accordance with the present invention, the headstock drill spindle and radial arm follow the prescribed path of the rectangular slides, and this can be done automatically with numerical controls by programming with presently available technology.

The Servo-Motors 57, 75 may be supported by the slide 42 in any suitable manner.

Instead of a drill spindle, any other cutting tool can be substituted. The headstock, in effect, is a cutting tool carrier.

Other objects of this invention will in part be obvious and in part hereinafter pointed out.

The invention accordingly consists in the features of construction, combinations of elements, and arrangement of parts which will be exemplified in the construction hereinafter described and of which the scope of the invention will be indicated in the following claims.

I claim:

1. A control for a drilling machine having a radial arm, means to pivot said arm about a fixed axis, a drill headstock slidable on said radial arm and provided with a drill spindle parallel to said axis, said control comprising a first slide, means to mount said first slide for reciprocal movement in a plane at right angles to said fixed axis, means to reciprocate said first slide, a second slide, means to mount said second slide on the first slide for reciprocal movement at right angles to the direction of movement of the first slide and at right angles to said axis, means to reciprocate said second slide relative to the first slide, and means on the second slide for rotatable connection with the headstock about the axis of said spindle.

2. The combination of claim 1, said means for reciprocating said first slide comprising a first electric motor and means controlled thereby to reciprocate said first slide, said means for reciprocating the second slide comprising a second electric motor and means controlled thereby, for reciprocating said second slide.

3. The combination of claim 2, said means controlled by the first motor comprising a nut fixed relative to said axis, a first screw threadedly received in said nut and rotatably but non-slidably mounted on said first slide and connected to the first motor for rotation by said first motor, and said means controlled by the second motor comprising a second screw rotatably and non-slidably mounted on said first side, and extending at right angles to the first screw, said second slide comprising a nut fixed thereto and threadedly receiving the second screw, and means to connect said second screw to said second motor for rotation of the second screw by said second motor.

4. The combination of claim 3, means to guide said first slide during reciprocal movement of said first slide, and cooperative means on said second slide and first slide to guide said second slide for reciprocal movement relative to said first slide.

5. The combination of claim 1, in combination with a radial arm drilling machine having a radial arm, means to pivot said arm about said fixed axis, and a drill headstock slidable on said radial arm and provided with a drill spindle parallel to said axis, and a shaft on said headstock coaxial with said spindle, engaged by said means on the second slide for rotatable connection about the axis of said spindle.

6. The combination of claim 5, said machine having a base, a column mounted on said base for rotation about said pivotal axis of said radial arm, and said radial arm being mounted on said column for rotation therewith.

7. The combination of claim 5, said means for reciprocating said first slide comprising a first electric motor and means controlled thereby to reciprocate said first slide, said means for reciprocating the second slide comprising a second electric motor, and means controlled thereby, for reciprocating said second slide.

8. The combination of claim 7, said means controlled by the first motor comprising a nut fixed relative to said axis, a first screw threadedly received in said nut and rotatably but non-slidably mounted on said first slide and connected to the first motor for rotation by said first motor, and said means controlled by the second motor comprising a second screw rotatably and non-slidably mounted on said first slide, and extending at right angles to the first screw, said second slide comprising a nut fixed thereto and threadedly receiving the second screw, and means to connect said secnd screw to said second motor for rotation of the second screw by said second motor.

9. The combination of claim 8, means to guide said first slide during reciprocal movement of said first slide, and co-operative means on said second slide and first side to guide said second slide for reciprocal movement relative to said first slide.

10. The combination of claim 1, said means for reciprocating said first slide comprising a first electric motor and means controlled thereby to reciprocate said first slide, said means for reciprocating the second slide comprising a second electric motor and means controlled thereby, for reciprocating said second slide, in combination with a radial arm drilling machine having a radial arm, means to pivot said arm about said fixed axis, and a drill headstock slidable on said radial arm and provided with a drill spindle parallel to said axis, and a shaft on said headstock coaxial with said spindle, engaged by said means on the second slide for rotatable connection about the axis of said spindle, said machine having a base, a column mounted on said base of rotation about said pivotal axis of said radial arm, and said radial arm being mounted on said column for rotation therewith.

11. The combination of claim 10, said means controlled by the first motor comprising a nut fixed relative to said axis, a first screw threadedly received in said nut and rotatably but non-slidably mounted on said first slide and connected to the first motor for rotation by said first motor, and said means controlled by the second motor comprising a second screw rotatably and non-slidably mounted on said first slide, and extending at right angles to the first screw, said second slide comprising a nut fixed thereto and threadedly receiving the second screw, and means to connect said second screw to said second motor for rotation of the second screw by said second motor.

12. The combination of claim 11, means to guide said first slide during reciprocal movement of said first slide, and co-operative means on said second slide and first slide to guide said second slide for reciprocal movement relative to said first slide.

13. The combination of claim 1, in combination with a radial arm drilling machine having a radial arm, means to pivot said arm about said fixed axis, and a drill headstock slidable on said radial arm and provided with a drill spindle parallel to said axis, and a shaft on said headstock coaxial with said spindle, engaged by said means on the second slide for rotatable connection about the axis of said spindle, said means on the second slide rotatably connected with the headstock about the axis of said spindle, comprising a bushing fixed to said second slide and rotatably receiving said shaft.

14. The combination of claim 13, and motor actuated means on the headstock to move said spindle up and down relative to said headstock.

15. In combination, a radial arm drilling machine comprising a base, a column rotatably mounted on said base, a radial arm mounted on said column and rotatable therewith, a drill headstock slidable back and forth on said radial arm, a drill spindle rotatably and slidably mounted on said headstock and disposed parallel to the axis of rotation of said column, and control means for moving the axis of the spindle of said headstock only along X—Y axes to bring the spindle from one drill position to another and thereby rotate said arm from the angular position of said arm in said one drilling position to the angular position of said arm in said another drilling position and to cause said headstock to slide on said arm during movement of said axis of said spindle only along said X—Y axes.

16. The combination of claim 15, in which the control means comprises a first slide, means to reciprocate the first slide at right angles to the axes of rotation of said column and spindle, a second slide slidably mounted on said first slide a right angles to the first slide, and having means to rotatably engage said headstock on the axis of said spindle.

17. In combination, a machine comprising an arm pivoted about a fixed axis of rotation, a cutting tool carrier slidable on said arm, a cutting tool mounted on said carrier on an axis parallel to said fixed axis, and control means to move the axis of said tool from one axial and radial predetermined position relative to the axis of rotation of the arm, to another axial and radial predetermined position relative to said axis, said control means comprising means to move said axis of said tool only along X—X and Y—Y axes, to thereby slidably move said carrier along said arm and to simultaneously rotate said arm about its axis of rotation.

18. The combination of claim 17, said control means comprising a first slide, a second slide mounted on the first slide for reciprocation at right angles to movement of the first slide, means to reciprocate said first slide on said X—X axis, means to reciprocate said second slide on the first slide, on said Y—Y axis, and means on said second slide having rotatable connection to said carrier about the axis of said tool.

19. The combination of claim 18, a first Servo-motor means to reciprocate the first slide, and a second Servo-motor means to reciprocate said second slide.

20. The combination of claim 17, and means on said carrier to rotate said cutting tool on said axis of said tool.

21. The combination of claim 17, said control means comprising a first slide, a second slide mounted on the first slide for reciprocation at right angles to movement of the first slide, means to reciprocate said first slide on an X—X axis, means to reciprocate said second slide on the first slide, on a Y—Y axis and means on said second slide having rotatable connection to said carrier about the axis of said tool, said first slide having a portion extending along the X—X axis and a second portion extending along the Y—Y axis, at right angles to said first portion, and extending beyond said first portion to opposite sides thereof, to form a T therewith, said second slide being mounted for reciprocation on said second portion of said first slide.

* * * * *